United States Patent [19]

Aizawa et al.

[11] Patent Number: 5,082,296
[45] Date of Patent: Jan. 21, 1992

[54] SPIRAL WOUND GASKET AND FABRICATION METHOD THEREOF

[75] Inventors: Junichi Aizawa; Yasushi Omata, both of Hitachi; Tatsuo Shimoyama, Higashimurayama; Kakuichi Kodama, Hino, all of Japan

[73] Assignee: extra-ministerial bureau of Ministry of International Trade and Industry, Japan Agency for Industrial Science and Technology, Tokyo, Japan

[21] Appl. No.: 485,427

[22] Filed: Feb. 27, 1990

[30] Foreign Application Priority Data

Apr. 7, 1989 [JP] Japan ............................. 1-87031

[51] Int. Cl.$^5$ ..................... F16J 15/12; B21D 39/00
[52] U.S. Cl. ............................ 277/204; 29/455.1; 29/469.5; 277/230; 277/233; 277/235 R
[58] Field of Search ..................... 277/119–125, 277/152, 179, 188 R, 188 A, 193, 196, 203, 204, 227, 230, 233, 234, 235 R, DIG. 6; 29/455.1, 455 R, 456, 469.5, 505

[56] References Cited

U.S. PATENT DOCUMENTS

| | | | |
|---|---|---|---|
| 622,889 | 4/1889 | Forsyth | 277/233 X |
| 1,370,234 | 3/1921 | Stewart | 277/233 X |
| 1,747,998 | 2/1930 | Sliter | 277/235 R X |
| 1,987,120 | 1/1935 | Loomis | 277/235 R X |
| 2,799,524 | 7/1957 | Zagorski et al. | 277/235 R X |
| 2,827,320 | 3/1958 | Kane | 277/204 X |
| 2,882,083 | 4/1959 | Palumbo et al. | 277/204 X |
| 3,365,203 | 1/1968 | Wallis | 277/227 X |
| 3,905,090 | 9/1975 | Painter | 277/204 X |
| 4,006,881 | 2/1977 | Gaillard | 277/DIG. 6 X |
| 4,119,323 | 10/1978 | Meister | 277/235 R |
| 4,180,211 | 12/1979 | Olcott et al. | 277/DIG. 6 X |
| 4,190,257 | 2/1980 | Schnitzler | 277/DIG. 6 X |
| 4,673,187 | 6/1987 | Hanson et al. | 277/204 X |
| 4,796,351 | 1/1989 | Gee | 277/227 X |
| 4,941,669 | 7/1990 | Fujisawa et al. | 277/235 R |

FOREIGN PATENT DOCUMENTS 56-101253  8/1981  Japan .

Primary Examiner—Allan N. Shoap
Assistant Examiner—Scott W. Cummings
Attorney, Agent, or Firm—Flynn, Thiel, Boutell & Tanis

[57] ABSTRACT

A spiral wound gasket is formed by winding combinedly and spirally a metal strip having at least one bend along its lateral direction and a belt-shaped filler in such a way that the metal strip and the filler are laminated together along their longitudinal direction and the filler protrudes from both lateral edges of the metal strip. The spiral wound gasket employs, as the filler, a flexible tape of carbon/carbon composites having a structure in which a carbon fiber, in the form of a bundle or string, is contained in the interior of an expanded graphite tape and the carbon fiber is located at the bend of the flexible tape formed when the laminate of the flexible tape and the metal strip in is wound. The spiral wound gasket is used as a pipe fitting etc. under high temperature and pressure conditions.

4 Claims, 1 Drawing Sheet

SPIRAL WOUND GASKET AND FABRICATION METHOD THEREOF

BACKGROUND OF THE INVENTION (a) Field of the Invention:

The present invention relates to a spiral wound gasket employing carbon/carbon composites of the soft type, which is used as a pipe fitting etc. for use under high temperature and pressure conditions, and a fabrication method thereof.

(b) Description of the Prior Art:

Spiral wound gaskets of this sort, as disclosed in Japanese Utility Model Laid-Open No. 101253/1981 (Applicant: Japan Pillar Industries Co.) by way of example, employ a tape made of asbestos or expanded graphite as a filler and have a structure of a metal strip having a V-shaped cross section, made of aluminum or copper, and said tape are laminated together in the longitudinal direction and wound spirally.

However, conventional spiral wound gaskets involve problems as described below.

With a spiral wound gasket employing a tape made of asbestos as a filler, the asbestos is apt to generate a large volume of dust during handling, raising such a sanitary problem that persons who have inhaled the dust for a long period of time are liable to get cancer of the lung. In addition, the elution of the halogen components in the asbestos into the fluid being sealed necessitates a sufficient anti-corrosion plan to be established. Moreover, due to the insufficient elasticity of the asbestos, its sealing performance is not always satisfactory.

On the other hand, with a spiral wound gasket employing an expanded graphite tape as a filler, the elution of the halogen components and the carcinogenic problem are avoided and the sealing performance is also improved. Nevertheless, it is necessary to further improve the sealing performance of the gasket in order to use the gasket under higher pressure conditions, keeping step with the recent development of technology. Since the expanded graphite tape is susceptible to breakage by nature, it occasionally breaks when the tape and the metal strip in a pile are wound by application of a tensile force. Further, the tape often breaks when it is bent. Hence it is necessary to improve the strength of the tape.

SUMMARY OF THE INVENTION

The present invention provides a spiral wound gasket employing flexible carbon/carbon composites of the soft type, the filler of which is an expanded graphite tape having improved in its sealing performance and its strength, and a fabrication method thereof.

The present inventors thought that in the bending section of the filler held by the bending section of the metal strip, the inner part of the filler has a slightly larger curvature than its outer part so that the clamping force of the metal strip to the filler is lower in that section than in other sections and hence voids are apt to form in that section, leading to inferior sealing performance in the winding direction of the spiral. Thus, the present inventors have made a variety of researches and finally found that by using as the filler a flexible tape made of novel, soft-type carbon/carbon composites with carbon fiber provided at the aforesaid bending section, the sealing performance is improved and, in addition, the filler is prevented from breakage when the filler and the metal strip in a pile are wound to form the spiral wound gasket. The present invention has been completed on the basis of this discovery.

The present invention relates to:

a spiral wound gasket formed by winding combinedly and spirally, a metal strip having at least one bend in the lateral direction and a belt-shaped filler in such a way that said metal strip and said filler are laminated together in the longitudinal direction and said filler protrudes from both edges in the lateral direction of said metal strip, characterized in that said filler is a flexible tape of carbon/carbon composites having a structure in which a carbon fiber, in a bundle or a string, is contained in the interior in the thickness direction of an expanded graphite tape and said carbon fiber is located at the bend of said flexible tape formed when the laminated of said flexible tape and said metal strip are wound; and a method of fabricating a spiral wound gasket of said structure, which comprises laminating together, in the longitudinal direction, a metal strip having at least one bend in the lateral direction and a filler made of a flexible tape of carbon/carbon composites, in which a bundle- or string-shaped carbon fiber is contained in the interior in the thickness direction of an expanded graphite tape, in such a way that said carbon fiber is located at the bend of said flexible tape formed when the laminate of said flexible tape and said metal strip in a pile are wound, and the width of the tape is larger than that of said metal strip, winding spirally the resulting laminate, and fixing both longitudinal ends of said metal strip at the start and end of the winding.

According to the present invention, it is possible to obtain a spiral wound gasket having excellent sealing performance by the use of a flexible tape employing soft-type carbon/carbon composites comprising a carbon fiber and an expanded graphite as a filler. Further, the aforesaid flexible tape employed in said spiral wound gasket has an increased strength so that it improves the efficiency of the winding operation of said metal strip laminated with said flexible tape.

DETAILED DESCRIPTION OF THE PREFERRED EMBODIMENTS

In the present invention, the expanded graphite tape is prepared by applying pressure, for example, by subjecting expanded graphite particles to rolling or compression molding by a conventional procedure. The carbon fiber is a bundle or string made of a plural number of filaments, which is well-known in the art and may preferably have a high strength. The number of filaments in the carbon fiber may properly be chosen according to the size of a desired spiral wound gasket. However, commercially available carbon fibers having 1,000–3,000 filaments may commonly be used satisfactorily.

Figure 1:
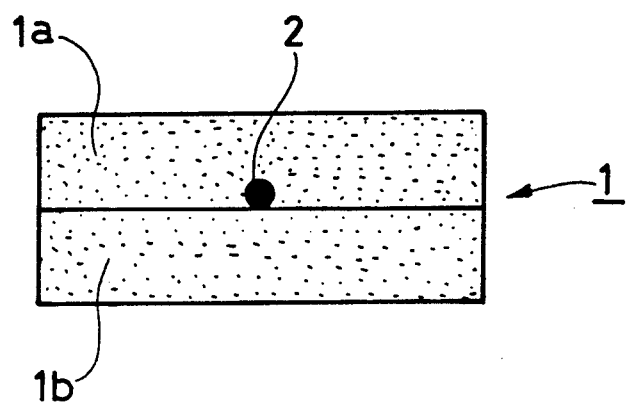
FIG. 1 is a cross section illustrating the structure of a composite tape for use in the fabrication of a spiral wound gasket according to the present invention.
Figure 2:
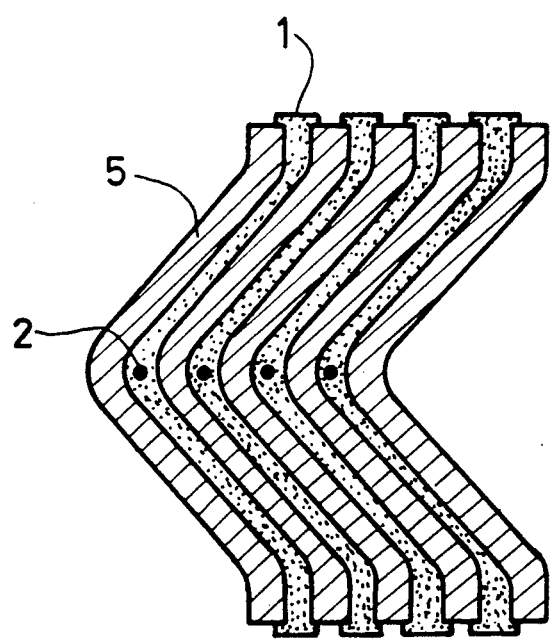
FIG. 2 is a cross section of a spiral wound gasket obtained in a example of the present invention.

The flexible tape made of carbon/carbon composites of the soft type (hereinafter referred to as "composite tape") according to the present invention is prepared by adhering two expanded graphite tapes $1a$ and $1b$ together, between which a carbon fiber 2 in a bundle or string is held, as shown in FIG. 1. The position of the carbon fiber 2 is, for example, at the center in the lateral direction of the expanded graphite tapes 1a and 1b, when the bent section of a metal strip having a V-shaped cross section is located at the center in the lateral direction of said metal strip. As seen in FIG. 2, this is because the carbon fiber 2 is located at the bent section of the composite tape 1 when the metal strip 5 having a V-shaped cross section and the composite tape 1 are laminated together and wound. For a larger spiral wound gasket, it is recommended that the cross section of the metal strip is made W-shaped or the like so that the metal strip may have a plurality of bending sections. In this case, the composite tape may be prepared similarly in such a way that a bundle- or string-shaped carbon fiber is located at each of the plurality of bent sections of said composite tape formed when the metal strip and the tape are laminated together and wound.

No particular restrictions are imposed on the width of the composite tape, which is selected in accordance with the size of a desired spiral wound gasket. It is necessary however for the composite tape to have such a width that both of its edges in the lateral direction protrude from the edges of the metal strip when the metal strip and the tape are laminated together and wound. The thickness of the composite tape may suitably be chosen depending on the intended use of a desired spiral wound gasket. Further, as seen in FIG. 1, the position of the carbon fiber 2 in the thickness direction of the composite tape 1 is determined by the the thickness of the expanded graphite tapes 1a and 1b. Here, it is desirable to place the carbon fiber 2 in a position between onethirds and two-thirds of the thickness of the composite tape 1.

In FIG. 1, the composite tape 1 is obtained by adhering the expanded graphite tapes 1a and 1b together in such a way that the carbon fiber 2 is held between them. The adherence is carried out by applying a varnish made of a thermosetting resin such as phenol resin and furan resin on either one or both of the surfaces of the expanded graphite tapes 1a and 1b to adhere the two surfaces together, the surfaces holding or being in contact with the carbon fiber 2, and then causing the varnish to cure with heat. If necessary, the resin is carbonized by heating the combined tapes at a high temperature (e.g. 1,000° C.). Thermoplastic resins may also be used as the adhesive resin depending on the purpose. Further, the composite tape 1 may also be prepared not by way of adhering but by incorporating a carbon fiber into an expanded graphite tape while the tape is being molded.

Preferred metal strips will have high strengths and superb weldabilities. Hoop materials made of stainless steel are generally used. The metal strip is smaller in width than the expanded graphite tapes 1a and 1b and has, for example, a V- or W-shaped in cross section.

The spiral wound gasket is fabricated by winding circularly and spirally the luminate of the metal strip with the composite tape and fixing both longitudinal ends of the metal strip by spot welding or the like. Here, it is preferable to wind only the metal strip 1-6 times at each of the start and end of the winding so that the inner and outer parts of the spiral wound gasket are composed only of the metal strip. Further, the composite tape and the metal strip are so wound that the tape protrudes from the edges of the metal strip on the both sides in the lateral direction of the spiral wound gasket.

Embodiments of the spiral wound gasket and the fabrication method thereof according to the present invention will further be illustrated specifically by reference to the drawings hereunder.

EXAMPLE 1

On an expanded graphite tape (HGP-207, made by Hitachi Chemical Co., Ltd.: 200 g/m$^2$ in weight per unit area, 0.2 mm in thickness, and 6.2 mm in width) 1b was applied a phenolic resin varnish (VP11N, made by Hitachi Chemical Co., Ltd.) as a binder and a carbon fiber (HTA-7, a PAN type fiber made by Toho Rayon Co., Ltd.; 1,000 filaments) 2 in a bundle was placed at the center of the tape. Then, an expanded graphite tape 1a, similar to the expanded graphite tape 1b, was pressed down thereon, and the resulting combined tapes were heated at 160° C. to cure the aforesaid resin and thereby bind the two expanded graphite tapes 1a and 1b together. Thus, a composite tape 1 with a thickness of 0.4 mm and a width of 6.2 mm was prepared, as seen in FIG. 1.

Then, as shown in FIG. 2, a metal strip (0.2 mm in thickness and 5.8 mm in width when extended) 5, of a stainless steel hoop material molded in a V-shape in advance, and the foregoing composite tape 1 were wound circularly and spirally while being laminate together in such a way that the V-shaped bent section of the metal strip was coincident in position with the carbon fiber 2 in the composite tape 1 Thus, a spiral wound gasket with an inner diameter of 90 mm, an outer diameter of 110 mm and a height of 4.5 mm was obtained. The composite tape 1, i.e. the filler, was allowed to protrude by about 0.2 mm from the both edges in the lateral direction of the metal strip 5. The metal strip 5 was wound solely 6 times at each of the start and end of the winding, and the both ends in longitudinal direction of the metal strip 5 were fixed respectively by spot welding.

COMPARATIVE EXAMPLE 1

A spiral wound gasket was obtained in the same manner as in Example 1, except for the use of an asbestos tape (0.4 mm in thickness and 6.2 mm in width) in place of the composite tape 1 described in Example 1 as the filler.

COMPARATIVE EXAMPLE 2

A spiral wound gasket with the same shape and size as that obtained in Comparative Example 1 was fabricated in the same manner as in Comparative Example 1, except for the use of an expanded graphite tape (HGP-207, manufactured by Hitachi Chemical Co., Ltd.; 400 g/m$^2$ in weight per unit area, 0.4 mm in thickness and 6.2 mm in width) in place of the asbestos tape described in Comparative Example 1 as the filler.

EXAMPLE 2

A spiral wound gasket was obtained in the same manner as in Example 1, except for the alteration of the number of filaments in the carbon fiber to 3,000.

EXAMPLE 3

On an expanded graphite tape (HGP-207, made by Hitachi Chemical Co., Ltd.; 200 g/m$^2$ in weight per unit area, 0.26 mm in thickness and 6.2 mm in width) was applied a phenolic resin vanish (VP11N made by Hitachi Chemical Co., Ltd.), and a carbon fiber (HTA-7, a PAN type fiber made by Toho Rayon Co., Ltd.; 1,000 filaments) was placed on the center of the expanded graphite tape. Then, an expanded graphite tape (HGP-207, made by Hitachi Chemical co., Ltd.; 200 g/m² in weight per unit area, 0.14 mm in thickness and 6.2 mm in width) was pressed down thereon. The two expanded graphite tapes sticked together in the same manner as in Example 1 to obtain a composite tape having the same size as that used in Example 1. A spiral wound gasket was then prepared in the same manner as in Example 1 by using the composite tape and the same metal strip as employed in Example 1.

EXAMPLE 4

A spiral wound gasket was fabricated in the same manner as in Example 1 except that the front (top) and the back (bottom) of the composite tape given in Example 3 were reversed (turned upside down).

EXAMPLE 5

The composite tape given in Example 1 was heated at a temperature of 800° C. in an atmosphere of nitrogen to carbonize the phenolic resin used as the binder. Using the resulting composite tape, a spiral wound gasket was prepared in the same manner as in Example 1.

The tensile strength of the asbestos tape in Comparative Example 1, the expanded graphite tape in Comparative Example 2 and the composite tape in each Example as well as the sealing performance of the spiral wound gasket obtained in each of the Examples and Comparative Examples are shown in Table 1.

TABLE 1

| | Tensile strength of tape (kg/cm²) | Sealing performance of gasket (He permeability: cm²/sec) |
|---|---|---|
| Comp. Ex. 1 | 80 | $5.2 \times 10^{-4}$ |
| Comp. Ex. 2 | 50 | $5.7 \times 10^{-7}$ |
| Example 1 | 2,000 | $2.9 \times 10^{-8}$ |
| Example 2 | 2,500 | $7.7 \times 10^{-8}$ |
| Example 3 | 2,000 | $5.0 \times 10^{-9}$ |
| Example 4 | 2,000 | $1.3 \times 10^{-7}$ |
| Example 5 | 2,000 | $2.2 \times 10^{-7}$ |

In this Table, the sealing performance was determined as He permeability k(cm²/sec) in accordance with the following equation using the data obtained by placing a jig sealed hermetically with a spiral wound gasket in a vacuum apparatus to evacuate the outer periphery of the spiral wound gasket, sealing helium (He) gas in the jig at 1 atmosphere and measuring the volume of the helium gas permeating from the inner periphery to the outer periphery of the spiral wound gasket.

$$K = \frac{\ln(r_o/r_i)}{2\pi} \times \frac{FRT}{LP} \quad (1)$$

$r_o$ : outer diameter of spiral wound gasket (cm)
$r_i$ : inner diameter of spiral wound gasket (cm)
F : flow rate of helium (mole/sec)
R : gas constant (cm³.atm/K.mole)
T : absolute temperature (K)
L : height of spiral wound gasket (cm)
P : gas pressure difference between inner and outer peripheries (atm)

As is obvious from Table 1, the tensile strength of the composite tapes in Examples 1 through 5 is far higher than that of the abestos tape in Comparative Example 1 or that of the expanded graphite tape in Comparative Example 2, and the spiral wound gaskets in Examples 1 through 5 have lower He permeabilities K than those in Comparative Example 1 and Comparative Example 2 and hence are superior in sealing performance.

We claim:

1. A spiral wound gasket formed by winding combinedly and spirally a metal strip having at least one bend in its lateral direction and a belt-shaped filler in such a way that said metal strip and said filler are laminated together along their longitudinal direction and said filler protrudes from both lateral edges of said metal strip, said filler being a flexible tape of carbon/carbon composites having a structure in which a carbon fiber in the form of a bundle or a string is contained in the interior of an expanded graphite tape and said carbon fiber is located at and extends longitudinally along the bend in said flexible tape formed when the laminate of said flexible tape and said metal strip is wound.

2. A spiral wound gasket according to claim 1 wherein said carbon fiber contained in the interior of said flexible tape of carbon/carbon composites is located at a position between one-thirds and two-thirds of the thickness of said flexible tape.

3. A method of fabricating a spiral wound gasket, which comprises: laminating, along its longitudinal direction, a metal strip having at least one bend in its lateral direction together with a filler made of a flexible tape of carbon/carbon composites, in which a carbon fiber in the form of a bundle or string is contained in the interior of an expanded graphite tape in such a way that said carbon fiber is located at and extends longitudinally along the bend in said flexible tape formed when the laminate of the flexible tape and said metal strip are wound, the width of said filler being larger than that of said metal strip; winding spirally the resulting laminate; and attaching both longitudinal ends of said metal strip at the start and end of the winding.

4. A method of fabricating a spiral wound gasket, which comprises: laminating, along its longitudinal direction, a metal strip having at least one bend in its lateral direction together with a filler made of a flexible tape of carbon/carbon composites in which a carbon fiber in the form of a bundle or string is contained at a position between one-thirds and two-thirds in the interior of an expanded graphite tape in such a way that said carbon fiber is located at and extends along the bend in said flexible tape formed when the laminate of the flexible tape and said metal strip is wound, the width of said filler being larger than that of said metal strip; winding spirally the resulting laminate; and attaching both longitudinal ends of said metal strip at the start and end of the winding.

* * * * *